United States Patent Office 3,847,851
Patented Nov. 12, 1974

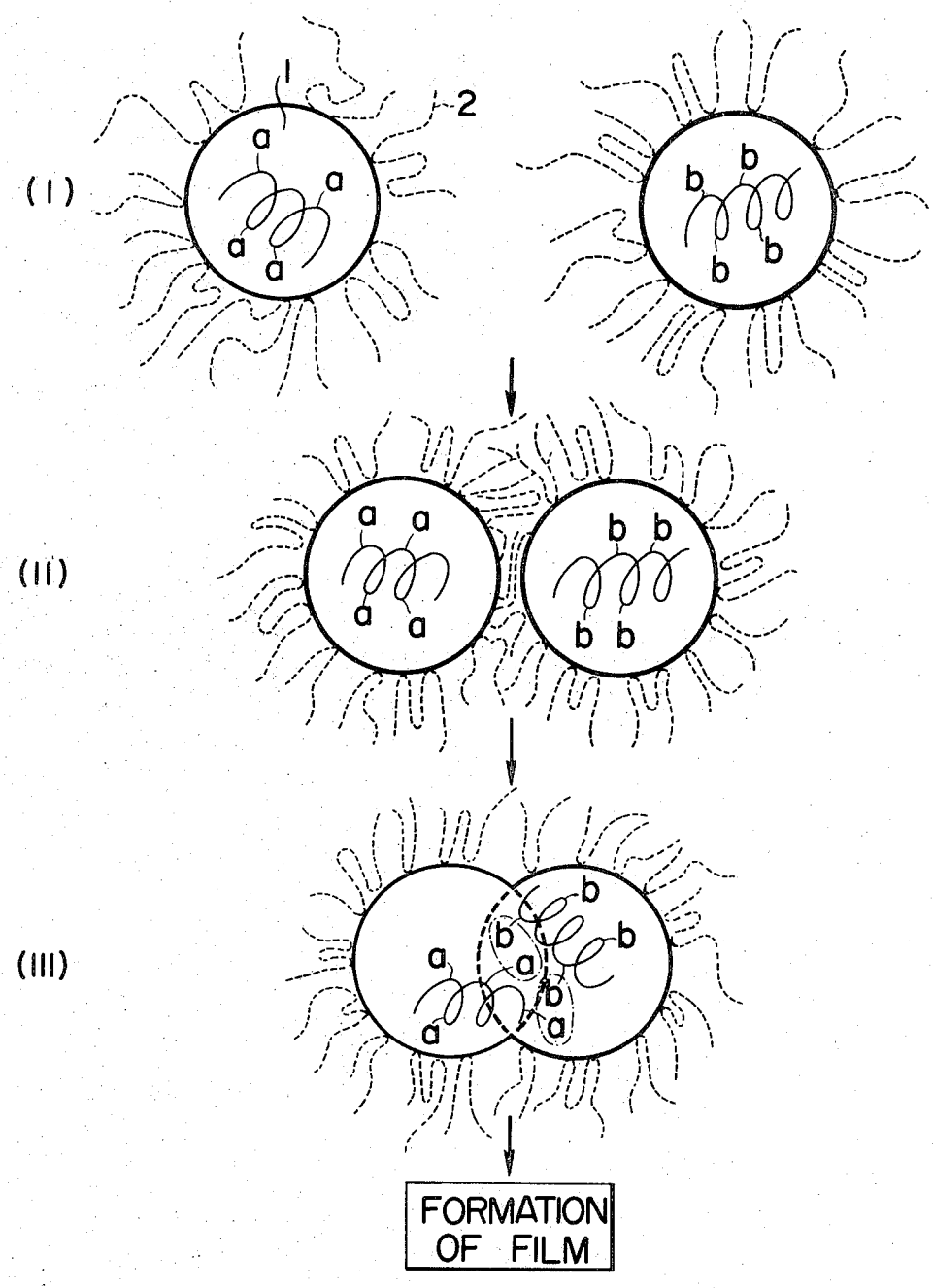

3,847,851
THERMOSETTING SYNTHETIC POLYMER DISPERSIONS AND PROCESS FOR PRODUCTION THEREOF
Hideyoshi Tugukuni, Sakai-shi, and Mitsuhiro Matsuda, Tondabayashi-shi, Japan, assignors to Dai Nippon Toryo Co., Ltd., Osaki-shi, Japan
Filed June 13, 1973, Ser. No. 369,765
Claims priority, application Japan, June 16, 1972, 47/60,215, 47/60,216
Int. Cl. C08f 45/28; C09d 3/48
U.S. Cl. 260—22 CB
10 Claims

ABSTRACT OF THE DISCLOSURE

A thermosetting synthetic polymer dispersion comprising a mixture of a polymer dispersion (I) comprising a polymer having a chemically reactive group, said polymer being dispersed stably in an organic liquid by a vinyl polymer, oil-modified alkyd resin, oil-modified epoxy resin or oil-modified urethane resin stabilizer solvated in said organic liquid, and a polymer dispersion (II) comprising a polymer having a complementary, chemically reactive group, said polymer being dispersed in the organic liquid by said stabilizer.

DESCRIPTION OF THE PRIOR ART

Conventional synthetic resin solvent solutions and aqueous emulsions have the following defects.

(1) A solution or emulsion of a low viscosity having a high polymer concentration cannot be obtained. For instance, in the case of an organic solvent solution it is impossible to obtain a solution or emulsion having a polymer concentration of 40–50% by weight while retaining the viscosity at a level of about 100 cps.

(2) The water resistance of the resulting film is poor. Since a hydrophilic emulsifier is used in large amount in an ordinary emulsion composition, the water resistance of a film prepared from such emulsion is extremely poor.

(3) The mechanical properties of the resulting film are inferior. The higher the degree of polymerization of the synthetic polymer in the case of a solvent solution type composition, the higher the viscosity of the solution. Thus, it is not allowable to employ a polymer having a high degree of polymerization, and therefore, the resulting film is inferior with respect to tensile strength and resistance to thermal degradation and impact.

(4) The gloss of the film is low. A film prepared from an aqueous emulsion type coating composition exhibits only a very low gloss.

(5) In an emulsion type coating composition, destruction of the emulsion occurs easily under freezing.

It is also known to obtain thermosetting polymer dispersions aimed at overcoming the foregoing defects of solvent solutions and aqueous emulsions of synthetic polymers.

For the preparation of such synthetic polymer dispersions, there have been known, for instance, the methods described below.

(1) A method for forming a cross-linkable polymer dispersion comprising the first step of copolymerizing an ethylenically unsaturated monomer with another ethylenically unsaturated monomer having a chemically reactive, cross-linking group in the presence of a block or graft copolymer dispersion stabilizer and the second step of adding an ethylenically unsaturated monomer and other ethylenically unsaturated monomer having a complementary, chemically reactive, cross-linking group to the reaction mixture and copolymerizing them in the reaction mixture (see U.S. Pat. No. 3,382,297 and British Pat. No. 1,095,288).

(2) A method for preparing a cross-linkable dispersion having an automatically oxidative component or a component capable of free radical-initiating addition reaction, which comprises forming a dispersion of an insoluble polymer containing at least one chemically reactive group per molecule of the polymer by dispersion polymerization of an α,β-ethylenically unsaturated monomer in the presence of a stabilizer, and reacting the resulting insoluble polymer with an unsaturated component having a complementary, chemically reactive group (Japanese Patent Publication No. 9,708/71).

(3) A method for forming a coating composition which comprises copolymerizing an olefinically unsaturated monomer having an alcoholic hydroxyl group with another olefinically unsaturated monomer in the presence of a polymer soluble in an organic liquid, and reacting the resulting copolymer with a polyisocyanate (Japanese Patent Publication No. 25,015/71).

As is apparent from the foregoing explanation, each of the conventional cross-linkable polymer dispersions is of the one-component type, and both the chemically reactive, cross-linking group and the complementary, chemically reactive, cross-linking group are present in said one component. Accordingly, the reaction readily occurs between the chemically reactive, cross-linking group and the complementary, chemically reactive, cross-linking group in such polymer dispersion. Therefore, cross-linking and gelation easily occur during the synthesis reaction, and hence, the thermal stability and storageage stability of the resulting polymer dispersion are extremely poor.

In the case of a dispersion of a polymer capable of autoxidation or free radical-initiating cross-linking, limitations are imposed on the system for such autoxidation or radical initiating cross-linking reaction. More specifically, in the case of a polymer dispersion of the autoxidation type, the kind of the automatically oxidative component which can be used is limited, and therefore, application fields of the resulting polymer dispersion are very limited. In the case of a polymer dispersion of the radical-initiating cross-linking reaction type, since it is difficult to obtain a cross-linked polymer because a linear polymer is easily formed, the kind of the component which can be used is greatly limited. Furthermore, in the case of a polymer dispersion of this type it is impossible to obtain thermosetting characteristics for formation of a film or coating.

SUMMARY OF THE INVENTION

This invention relates to a novel thermosetting synthetic polymer dispersion which can overcome the foregoing defects of the conventional techniques.

Objects of this invention are to (1) obtain a polymer dispersion which has very excellent storage stability, (2) obtain a polymer dispersion in the stabilized state free of gelation or the like, and (3) obtain a film having excellent resistance to chemicals and solvents.

In accordance with this invention, there is provided a thermosetting synthetic polymer dispersion comprising a dispersion (I) of a polymer having a chemically reactive group, said polymer being stably dispersed in an organic liquid by at least one stabilizer selected from the group consisting of (a) vinyl polymers, (b) unsaturated fatty acid-containing oil-modified alkyd resins, (c) unsaturated fatty acid-containing oil-modified epoxy resins and (d) unsaturated fatty acid-containing oil-modified urethane resins, said stabilizer being solvated in the organic liquid, and a dispersion (II) of a polymer having a complementary, chemically reactive group which is stably dispersed in the organic liquid by at least one stabilizer selected from the same group as mentioned above. In accordance with this invention, there is also provided a process for the preparation of such thermosetting polymer dispersion.

BRIEF DESCRIPTION OF THE DRAWING

The drawing diagrammatically illustrates the process steps of preparing a film from the synthetic polymer dispersion of this invention, in which:

(I) is a diagram illustrating one model of particles in the synthetic polymer dispersions of this invention, where (a) and (b) indicate a chemically reactive group and a complementary, chemically reactive group, respectively and (1) and (2) indicate a polymer particle insoluble in the organic liquid and a stabilizer soluble in the organic liquid, respectively;

(II) is a model diagram illustrating the state where polymer particles approximate one another with the evaporation of the organic liquid; and (III) is a model diagram illustrating the fusion and adhesion of polymer particles and the initiation of the cross-linking reaction between the chemically reactive group (a) and the complementary, chemically reactive group (b).

DETAILED DESCRIPTION OF THE INVENTION

The polymer dispersion (I) to be used in this invention can be prepared in the following manner.

In short, the polymer dispersion (I) is prepared by copolymerizing a vinyl monomer (A) with a vinyl monomer (B) having a chemically reactive group, said vinyl monomer (A) being incapable of being cross-linked with said vinyl monomer (B), in an organic liquid capable of dissolving the vinyl monomers (A) and (B) but incapable of dissolving a polymer formed by polymerization of the vinyl monomer (A) in the presence of a stabilizer solvated in the organic liquid.

Similarly, the polymer dispersion (II) is prepared by copolymerizing a vinyl monomer (A) with a vinyl monomer (C) having a complementary, chemically reactive group, said vinyl monomer (A) being incapable of being cross-linked with said vinyl monomer (C), in the presence of an organic liquid capable of dissolving said vinyl monomers (A) and (C) but incapable of dissolving a polymer formed by polymerization of the vinyl monomer (A) in the presence of a stabilizer solvated in the organic liquid.

Then, the thus formed polymer dispersions (I) and (II) are mixed at a suitable ratio to form the intended thermosetting synthetic polymer dispersion of this invention.

In each of the polymer dispersions (I) and (II), monomers (A) and (B) or (A) and (C) are block- or graft-copolymerized in case the stabilizer solvated in the organic liquid contains an unsaturated double bond, and the resulting polymer particles are present stably in the organic liquid. In case the amount of the double bond is extremly small, the polymer component is entangled with the stabilizer solvated in the organic liquid, and by this entanglement the polymer particles can be present stably in the organic solvent. As is seen from the drawings wherein (I) diagrammatically shows one model of particles of the thus formed polymer, the polymer particles are stably dispersed in the organic liquid with the solvated component being positioned on the outer periphery.

In preparing the polymer dispersion (I) or (II), the stabilizer to be solvated in the organic liquid may be prepared in advance in a different vessel and it may then be incorporated in a vessel charged with the organic liquid to be used in this invention. It is also possible to prepare such stabilizer by polymerizing starting substances in a vessel charged with the organic liquid to be used in this invention and thus solvating the resulting polymer in the organic liquid.

In the case of the former method, a commercially available, unsaturated fatty acid-containing oil-modified alkyd, epoxy or urethane resin, or a vinyl polymer capable of being solvated in the organic liquid to be used in this invention can be employed.

In the case of the latter method, it is possible to obtain, for instaence, an oil-modified alkyd resin solvated in an organic liquid by condensing an unsaturated fatty acid-containing oil component, a polyhydric alcohol component and a polybasic acid component in a reaction vessel charged with the organic liquid. It is also possible to obtain a vinyl polymer solvated in an organic liquid by employing a vinyl monomer (D) and conducting the polymerization in the organic liquid. Especially when a vinyl polymer solvated in the organic liquid is prepared from a vinyl monomer (D), about 70 to 85% of the monomer (D) can be combined in the reacted state with the vinyl monomers (A) and (B) or (A) and (C). The attainment of such reaction ratio as 70 to 85% is made possible by appropriately controling the kind of the monomer (D), the reaction time or temperature and the like.

The organic liquid to be used in this invention, which is capable of dissolving monomers but incapable of dissolving polymers formed from the monomers, includes organic liquids having no polarity or a relatively low dissolving power, such as aliphatic and aromatic hydrocarbons, e.g., VM & P naphtha, mineral spirits, kerosene, petroleum naphtha and solvent naphtha; aliphatic hydrocarbons, e.g., n-butane, n-hexane, n-heptane, n-octane, isononane, n-decane and n-dodecane; and alicyclic hydrocarbons, e.g., cyclopentane, cyclohexane and cycloheptane. They may be used singly or in the form of admixtures of two or more of them.

The unsaturated fatty acid-containing oil to be used in this invention includes drying and semi-drying oils such as linseed oil, tung oil, Chinese tung oil, oiticica oil, perilla oil, dehydrated castor oil, tall oil, soybean oil, safflower oil, cotton seed oil and rice bran oil, and non-drying oils such as coconut oil and olive oil, and fatty acids of these oils. They are used singly or in the form of admixtures of two or more of them.

The unsaturated fatty acid-containing oil-modified alkyd resin to be used in this invention is a reaction product formed by polycondensation of an unsaturated fatty acid-containing oil component such as exemplified above with the following basic acid component and polyhydric alcohol component.

(1) A basic acid component selected from (a) saturated polybasic acids such as phthalic anhydride, terephthalic acid, isophthalic acid, tetrachlorophthalic anhydride, tetrahydrophthalic anhydride, succinic acid, adipic acid and sebacic acid, (b) unsaturated polybasic acids such as maleic acid, maleic anhydride, fumaric acid, itaconic acid and citraconic anhydride, (c) polybasic acids obtained by diene synthesis such as cyclopentadiene-maleic anhydride adduct, terpenemaleic anhydride adduct and rosin-maleic anhydride adduct, and (d) monobasic acids such as benzoic acid and p-tert-butyl benzoic acid; and (2) A polyhydric alcohol component selected from (a) dihydric alcohols such as ethylene glycol, diethylene glycol, triethylene glycol, propylene glycol, trimethylene glycol and tetramethylene glycol, (b) trihydric alcohols such as glycerine and trimethylol propane, and (c) polyhydric alcohols such as diglycerol, triglycerol, 1,2,6-hexanetriol, sorbitol, pentaerythritol, dipentaerythritol and mannitol.

The thus formed polycondensation product has a molecular weight of 500 to 10,000, preferably 2,000 to 4,000, an acid value not exceeding 10, an OH value not exceeding 10 and an oil length of 35 to 80%, preferably 45 to 70%.

The unsaturated fatty acid-containing oil-modified epoxy resin to be used in this invention includes resins having an acid value not exceeding 10, an OH value not exceeding 10, an oil length of 35 to 80%, preferably 45 to 70%, and a molecular weight of about 1,000 to 3,000, which are formed by esterifying an epoxy resin with an oil component such as mentioned above.

The epoxy resin to be used for formation of the above esterified epoxy resin includes resins having at least two epoxy groups in the molecule, such as epoxy resins of the bisphenol A-epichlorohydrin condensation type, the halogenated bisphenol type, the resorcin type, the bisphenol F type, the tetrahydroxyphenyl methane type, the novolac type, the polyglycol type and of the glycerine triether type. The weight ratio of such epoxy resin to the oil component is preferably in the range of from 20/80 to 65/35.

The unsaturated fatty acid-containing oil-modified urethane resin (urethanated oil resin) to be used in this invention includes resins having an acid value not exceeding 10, an OH value not exceeding 10, an oil length of 35 to 80%, preferably 45 to 70%, and a molecular weight of about 1,000 to 3,000, which are prepared by the reaction between a diisocyanate and a monoglyceride or diglyceride which is a product formed by the reaction between a polyhydric alcohol and an oil component such as mentioned above. In the urethanated oil resin, it is preferred that the weight ratio of the isocyanate component to the oil component (glyceride) is within the range of from 20/80 to 65/35.

The preparation of a diglyceride and the formation of a urethanated oil resin from, for instance, a diglyceride and a diisocyanate are expressed by the following reaction formulae:

(1) Preparation of diglyceride:

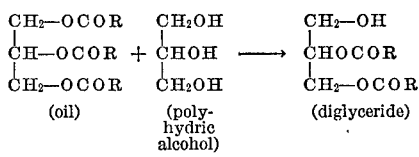

(2) Formation of urethanated oil resin:

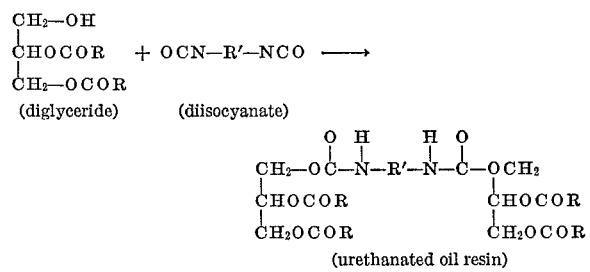

As the diisocyanate compound to be used for formation of the above urethanated oil resin in this invention, there may be mentioned, for instance, ethylene diisocyanate, propylene diisocyanate, tetramethylene diisocyanate, hexamethylene diisocyanate, decamethylene diisocyanate, phenylene diisocyanate, tolylene diisocyanate, naphthalene diisocyanate, 4,4' - methylene - bis (phenyl isocyanate), 4,4' - ethylene - bis (phenyl isocyanate), 3,3'-diisocyanate - 1,3 - dimethylbenzene, 3,3' - diisocyanate - 1,4 - dimethylbenzene, 1 - methyl - 2,4 - diisocyanate - cyclohexane, 3,3' - diisocyanate - diethylbenzene, 3,3' - diisocyanate - dimethyltoluene, 3,3' - diisocyanate - diethyltoluene, 3,3' - diisocyanate - dimethylxylene, 3,3' - diisocyanate - diethylxylene, 4,4' - methylene - bis (cyclohexyl isocyanate), 4,4' - ethylene - bis (cyclohexyl isocyanate), isophoronediamine diisocyanate and lysine diisocyanate. Polyvalent isocyanates formed by addition reaction between an excess of a diisocyanate compound such as mentioned above and a low molecular weight polyol (such as trimethylol propane, ethylene diglycol and the like), and polyvalent isocyanates having a biuret structure may be used in this invention. These isocyanate compounds may be used singly or in the form of admixtures of two or more of them.

As the polyhydric alcohol to be used for formation of the glyceride component, there may be mentioned, for example, ethylene glycol, propylene glycol, diethylene glycol, butylene glycol, 2,2' - dimethylol propanediol, glycerine, trimethylol ethane, trimethylol propane, 1,2,6 - hexanediol, pentaerythritol, sorbitol, diglycerol and dipentaerythritol.

Formation of urethanated oil resins from the above-mentioned oil, polyhydric alcohol and diisocyanate components may be effected according to known synthesis methods, and commercially available urethanated oil resins may also be used in this invention as they are.

The vinyl polymer solvated in the organic liquid, which is used in this invention, is a polymer of an $\alpha,\beta$-ethylenically unsaturated monomer (monomer D) such as those exemplified below.

As such monomer D, there may be mentioned, for example, acrylic acid esters such as n-butyl acrylate, isobutyl acrylate, tert-butyl acrylate, 2-ethyl-hexyl acrylate, lauryl acrylate, tridecyl acrylate, stearyl acrylate, cyclohexyl acrylate, hexyl acrylate, isodecyl acrylate, dodecyl acrylate and octadecyl acrylate; methacrylic acid esters such as n-butyl methacrylate, isobutly methacrylate, tert-butyl methacrylate, 2-ethylhexyl methacrylate, lauryl methacrylate, tridecyl methacrylate, cyclohexyl methacrylate, hexyl methacrylate, isodecyl methacrylate, dodecyl methacrylate and octadecyl methacrylate; dialkyl fumarates such as dihexyl fumarate, dioctyl fumarate,, di-2-ethylhexyl fumarate, didodecyl fumarate and dioctadecyl fumarate; dialkyl itaconates such as dihexyl itaconate, di-2-ethylhexyl itaconate, didodecyl itaconate and dioctadecyl itaconate; and vinyl stearate and the like.

The foregoing stabilizers selected from vinyl polymers, oil-modified alkyd resins, oil-modified epoxy resins and oil modified urethane resings can be used singly or in the form of admixtures of two or more of them. In case a mixture of such stabilizers is employed, the compatibility between the stabilizers should be taken into consideration. For instance, it is possible to employ a combination of an oil-modified alkyd resin and an oil-modified epoxy resin or a combination of an oil-modified alkyd resin and an oil-modified urethane resin.

The vinyl monomer (A) to be used in this invention is a monomer having a copolymerizable double bond $>C=C<$ in the molecule and containing no other chemically reactive group exemplifying in the monomers (B) and (C) hereinafter described. The "chemical reaction" designated by the term "chemically reactive" group is a reaction between the chemically reactive group and the complementary, chemically reactive group. Combinations of such chemically reactive groups and complementary, chemically reactive groups are indicated in the Table given hereinafter.

Examples of such monomer (A) are alkyl esters of acrylic acid having 1 to 3 carbon atoms in the alkyl moiety, such as methyl acrylate, ethyl acrylate, n-propyl acrylate and isopropyl acrylate; alkyl esters of methacrylic acid having 1 to 3 carbon atoms in the alkyl moiety, such as methyl methacrylate, ethyl methacrylate, n-propyl methacrylate and isopropyl methacrylate; styrene type monomers such as styrene, vinyl toluene and $\alpha$-methyl styrene; and other monomers such as vinyl formate, vinyl acetate, vinyl propionate, dimethyl itaconate, vinly chloride, vinylidene chloride, acrylonitrile and methacrylonitrile. These monomers can be used singly or in the form of admixtures of two or more of them. Especially when a mixture containing methyl methacrylate is employed as the monomer (A), the resulting polymer is very suitable as a coating composition giving film having excellent properties. When acrylonitrile is employed as one monomer (A), the solvent resistance of the dispersed polymer is improved and the distribution range of the particle size in the resulting polymer can be maintained within a very narrow range.

It is possible to employ this monomer (A) in combination with the above-mentioned vinyl monomer (D). In this case, it is necessary that both the monomers be used in such a ratio that the resulting copolymer cannot be dissolved in the organic liquid, and it is preferred that the ratio of (vinyl monomers (D))/(vinyl monomer (D) plus vinyl monomer (A)) is less than 0.5.

The monomer (B) having a chemically reactive group, which is employed in this invention, and the monomer (C) having a complementary, chemically reactive group, which is also used in this invention, are monomers having in the molecule a copolymerizable unsaturated double bond >C=C< and a chemically reactive group or complementary, chemically reactive group. Specific examples of combinations of the monomers (B) and (C) are shown in the Table given below.

and (C), is from 80/20 to 10/90, preferably 70/30 to 20/80.

Especially in case a vinyl polymer is used as the stabilizer, it is desired that the above weight ratio be within the range of from 30/70 to 10/90. In case an oil-modified alkyd, epoxy or urethane resin is employed as the stabilizer, it is desired that the above weight ratio be within a range of 80/20 to 20/80, especially 60/40 to 30/70.

The monomer (A) having a chemically reactive group or the monomer (C) having a complementary, chemi-

TABLE

| Chemically reactive group | Vinyl monomer (B) | Complementary, chemically reactive group | Vinyl monomer (C) |
|---|---|---|---|
| Carboxylic acid | (Meth)acrylic acid, maleic acid, alkyl hydrogen maleate, itaconic acid. | Epoxide | Glycidyl (meth)acrylate epoxy alkyl (meth)acrylate. |
| | | Or amine | Vinyl amine, allyl amine. |
| Or sulfonic acid | Vinyl sulfonic acid | | Vinyl pyridine. |
| Or phosphonic acid | Vinyl phosphonic acid | Or hydroxylmethyl amide, alkoxymethyl amide, dialkylaminomethyl amide, alkylcarbonyloxymethyl amide. | N-hydroxymethyl (meth)acrylate, alkoxymethyl (meth)acrylate, dialkylaminomethyl acrylamide, alkylcarbonyl-oxymethyl acrylamide. |
| Acid anhydride | (Meth)acrylic anhydride, maleic anhydride. | Epoxide | Glycidyl (meth)acrylate, epoxyalky (meth)acrylate. |
| | | Or amine | Vinyl amine, allyl amine, ketoimine of aminoalkyl (meth)acrylate. |
| | | Or hydroxyl | Hydroxyalkyl (meth)acrylate, allyl alcohol. |
| Carboxyl chloride or sulfonyl chloride. | (Meth)acryl chloride | Amine | Allyl amine, vinyl amine, ketoimine of aminoalkyl (meth)acrylate. |
| Reactive ester | Cyanomethyl acrylate, alkylcarbonyl-oxymethyl acrylate. | Amine | Allyl amine, vinyl amine. |
| Hydroxyl | Hydroxyalkyl (meth)acrylate allyl alcohol, partially saponified vinyl acetate (co)polymer. | Epoxide | Glycidyl (meth)acrylate epoxyalkyl (meth)acrylate. |
| | | Or isocyanate | Vinyl isocyanate, monoadduct of hydroxyalkyl (meth)acrylate to polyisocyanate such as monoadduct of β-hydroxypropyl methacrylate to toluene diisocyanate. |
| | | Or hydroxymethyl amide or alkoxymethyl amide (plus acid catalyst). | Hydroxymethyl (meth)acrylamide, alkoxy ethyl (meth)acrylamide. |
| Epoxide | Glycidyl (meth)acrylate, epoxyalkyl (meth)acrylate. | Amine | Allyl amine, vinyl amine, ketoimine of aminoalkyl (meth)acrylate. |
| Isocyanate and modified isocyanate. | Vinyl isocyanate, monoadduct of hydroxyalkyl (meth)acrylate to polyisocyanate. | Amine | Allyl amine, vinyl amine, ketoimine of aminoalkyl (meth)acrylate. |
| Reactive chlorine compound. | Vinyl-β-chloroethyl sulfone, combination of cyanuric chloride and hydroxyalkyl (meth)acrylate. | Amine | Allyl amine, vinyl amine. |

A radical initiator may be used for the preparation of polymer dispersions. Examples of usable organic peroxide initiators are benzoyl peroxide, lauryl peroxide, cumene hydroperoxide, di-tert-butyl peroxide and acetyl peroxide. Nitrile type initiators such as α,α'-azobisisobutyronitrile may also be employed. The amount of the initiator is 0.01 to 3% by weight, preferably 0.5 to 1% by weight, based on the total monomers.

In carrying out the process of this invention, the reaction temperature is 50 to 140° C., preferably 70 to 100° C., and the polymerization time is preferably 1 to 10 hours. It is preferable to feed nitrogen into the reactor during the polymerization reaction, but feeding of nitrogen is not always necessary. In some special cases, for instance, in case gaseous monomers are employed, the reaction may be carried out under pressure.

The synthetic polymer dispersions (I) and (II) prepared under the foregoing reaction conditions are mixed together according to a conventional method to obtain a thermosetting synthetic polymer dispersion.

In each of the polymer dispersions (I) and (II) to be used in this invention, the weight ratio of the stabilizer component solvated in the organic liquid and the copolymer component, i.e., the copolymer prepared from the vinyl monomers (A) and (B) or the vinyl monomers (A)

cally reactive group occupies about 2 to 30% by weight of the copolymer component.

In the synthetic polymer dispersion of this invention comprising the above polymer dispersions (I) and (II), the mole ratio of the chemically reactive group and the complementary, chemically reactive group is 0.5 to 2.0, preferably 0.7 to 1.5. In case the mole ratio of the above two reactive groups is 1, namely in case they are present at the equimolar ratio, the mixing weight ratio of the polymer dispersion (I) and polymer dispersion (II) based on the non-volatile components is within a range of from 10/90 to 90/10, preferably 30/70 to 70/30.

According to the foregoing process, there can be obtained a thermosetting synthetic polymer dispersion comprising (I) a synthetic polymer dispersion comprising particles of a copolymer formed from (A) a copolymerizable unsaturated monomer and (B) a copolymerizable unsaturated monomer having a chemically reactive group and a protective layer formed around said copolymer particles, which is composed of a stabilizer (i) having a component compatible with said copolymer or being chemically bonded thereto and (ii) being solvated in an organic liquid having no polarity or a low polarity, said copolymer particles being stably dispersed in the organic liquid by said protective layer and having an average particle size of 0.1 to 10μ, and (II) a synthetic polymer dispersion comprising particles of a copolymer formed from (A) a copolymerizable unsaturated monomer and (C) a copolymerizable unsaturated monomer having a complementary, chemically reactive group and a protective layer formed around said copolymer particles, which is composed of a stabilizer (i) having a component compatible with said copolymer or being chemically bonded thereto and (ii) being solvated in an organic liquid having no polarity or a low polarity, said copolymer particles being stably dispersed in the organic liquid by said protective layer and having an average particle size of 0.1 to 10μ.

The thus obtained thermosetting synthetic polymer dispersion of this invention comprises a dispersed polymer (1) having a chemically reactive group included in one dispersed polymer particle and a dispersed polymer (II) having a complementary, chemically reactive group included in another dispersed polymer particle (see (I) in the drawing). Because of this specific structure, the undesired contact between the chemically reactive group and the complementary chemically reactive group, such as is readily caused in conventional polymer dispersions, can be completely prevented in the thermosetting polymer dispersion of this invention. Therefore, gelation by the cross-linking reaction is not caused during the synthesis of the dispersed polymers and the resulting product is a polymer dispersion having an excellent storage stability.

When the thermosetting polymer dispersion of this invention is coated on a substrate and heated at, for instance, 80 to 300° C. for 10 to 60 minutes, with evaporation of the organic liquid, polymer particles approximate one another (see (II) in the drawing). When the heating is further continued, the two kinds of dispersed polymers adhere to one another, and the particles are destroyed, with the result that the chemically reactive group in one particle is contacted with the complementary, chemically reactive group in another particle to cause the cross-linking reaction and thus, an excellent thermoset film can be obtained (see (III) in the drawing). These are characteristic properties of the thermosetting synthetic polymer dispersion of this invention. Further, the thermosetting synthetic polymer dispersion of this invention is different from a so-called air-drying type composition in which a film is formed merely by evaporation of the organic liquid, but it belongs to a heat curing or cross-linking type film-forming composition. Accordingly, properties of the resulting film are very excellent.

Further, polymer dispersions (I) and (II) of the thermosetting polymer dispersion of this invention contain the same or similar organic liquids. Therefore, they can be mixed very easily and the resulting polymer dispersion exhibits an excellent storage stability. Moreover, the thermosetting synthetic polymer dispersion has an advantage that a curing agent solution containing an organic liquid capable of dissolving or swelling synthetic polymer particles (such as, for example, a melamine resin solution) need not be added and the cross-linking reaction can be accomplished sufficiently without addition of such curing agent solution.

Additives usually employed for paint compositions, such as organic and inorganic coloring pigments, extenders, dyestuffs, driers, etc. may be added to the polymer dispersion of this invention, if desired.

Thus, in accordance with this invention, there can be provided polymer dispersions useful especially as coating compositions.

Further, films having excellent gloss, water resistance, chemical resistance, weather resistance, solvent resistance and other excellent properties can be prepared from the polymer dispersions according to this invention.

In case the polymer dispersion is used as a coating composition, it may be coated on a substrate, e.g., a plate of a metal such as iron, aluminum, zinc and zinc-plated steel, plywood, wooden board, paper, cloth, fabrics, plastics and the like.

This invention will now be described in more detail by reference to examples, where all "parts" and "percentages" are on the weight basis, unless otherwise indicated.

EXAMPLE 1

(a) Synthesis of Dispersion (I)

A reaction vessel equipped with a stirrer, a reflux condenser and a thermometer was charged with 1,000 parts of mineral spirits and 2,000 parts of a 50% cotton seed oil-modified alkyd resin medium oil varnish having an oil length of 55%, an acid value of 5 and an OH value of 6, and the contents of the reaction vessel were maintained at 82° C. A mixture of the following ingredients was added dropwise to the reaction vessel over a period of 3 hours:

| | Parts |
|---|---|
| Acrylonitrile | 100 |
| Methyl methacrylate | 700 |
| Methacrylic acid | 40 |
| Styrene | 160 |
| Benzoyl peroxide | 10 |

The reaction was carried out under agitation at 82 to 85° C. for about 10 hours to obtain a polymer dispersion (I) having a solids content of 49.5%.

(b) Synthesis of Dispersion (II)

1,000 parts of mineral spirits and 2,000 parts of a 50% cotton seed oil-modified alkyd resin medium oil varnish having the same composition as the varnish used in (a) above were maintained at 82° C. and a mixture of the following ingredients was added thereto over a period of 3 hours:

| | Parts |
|---|---|
| Acrylonitrile | 100 |
| Methyl methacrylate | 700 |
| N-n-butoxymethyl acrylamide | 120 |
| Styrene | 80 |
| Benzoyl peroxide | 10 |

The reaction was carried out under agitation at 82 to 85° C. for about 10 hours to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. This polymer dispersion was coated on a substrate and heated at 150° C. for 30 minutes. As a result of the solvent extraction test made on the resulting film, it was found that in the resulting film the carboxyl group of the polymer dispersion (I) was highly cross-linked with the butoxyacrylamide group of the polymer dispersion (II). The resulting film was transparent and had an excellent gloss.

EXAMPLE 2

(a) Synthesis of Dispersion (I)

A reaction vessel equipped with a stirrer, a reflux cooler and a thermometer was charged with 1,000 parts of mineral spirit and a 50% cotton seed oil-modified alkyd resin medium oil varnish having the same composition as the varnish used in Example 1(a) and the charges of the reaction vessel were maintained at 85° C. A mixture of the following ingredients was added dropwise to the reaction vessel over a period of 3 hours:

| | Parts |
|---|---|
| Ethyl acrylate | 100 |
| Methyl methacrylate | 700 |
| Methacrylic acid | 40 |
| Styrene | 160 |
| Benzoyl peroxide | 10 |

The reaction was carried out under agitation at 82 to 85° C. for about 10 hours to obtain a polymer dispersion (I) having a solids content of 49.5%.

(b) Synthesis of Dispersion (II)

1,000 parts of mineral spirits and 2,000 parts of a 50% cotton seed oil-modified alkyd resin medium oil varnish having the same composition as the varnish used in (a) above were maintained at 82° C., and a mixture of the following ingredients was added thereto over a period of 3 hours:

| | Parts |
|---|---|
| Acrylonitrile | 100 |
| Methyl methacrylate | 700 |
| N-n-butoxymethyl acrylamide | 120 |
| α-Methyl styrene | 80 |
| Benzoyl peroxide | 10 |

The reaction was carried out at 82 to 85° C. under agitation for about 10 hours to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. This polymer dispersion was coated on a substrate and heated at 150° C. for 30 minutes. As a result of the solvent extraction test made on the resulting film, it was found that in the resulting film the carboxyl group of the polymer dispersion (I) was highly cross-linked with the butoxyacrylamide group of the polymer dispersion (II). The resulting film was transparent and had an excellent gloss.

EXAMPLE 3

(a) Synthesis of Dispersion (I)

Mixture (1):

| | Parts |
|---|---|
| Mineral spirits | 1,000 |
| 50% soybean oil-modified epoxy resin varnish having an oil length of 57%, an acid value of 6 and an OH value of 3.5 | 2,000 |

Mixture (2):

| | Parts |
|---|---|
| Acrylonitrile | 100 |
| Methyl methacrylate | 700 |
| 2-hydroxyethyl methacrylate | 60 |
| Styrene | 140 |
| Benzoyl peroxide | 10 |

In the same manner as described in Example 1, the mixture (1) was maintained at 82° C. and the mixture (2) was added thereto over a period of 3 hours. The reaction was carried out at 82 to 85° C. under agitation for about 10 hours to obtain a polymer dispersion (I) having a solids content of 49.5%.

(b) Synthesis of Dispersion (II)

Mixture (3):

| | Parts |
|---|---|
| Mineral spirits | 1,000 |
| 50% cotton seed oil-modified alkyd resin varnish as that used in (a) of Example 1 | 2,000 |

Mixture (4):

| | Parts |
|---|---|
| Acrylonitrile | 100 |
| Methyl methacrylate | 700 |
| Reaction product between 2-hydroxyethyl methacrylate and toluene diisocyanate | 50 |
| Styrene | 150 |
| Benzoyl peroxide | 10 |

Mixtures (3) and (4) were reacted in the same manner as described in (a) above to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. This polymer dispersion was coated on a substrate and heated at 100° C. for 30 minutes. The resulting film was transparent and had an excellent gloss. In the resulting film the isocyanate group was highly cross-linked with the hydroxyl group, and the resulting film had a good solvent resistance.

EXAMPLE 4

(a) Synthesis of Dispersion (I)

Mixture (1):

| | Parts |
|---|---|
| Mineral spirits | 1,000 |
| 50% soybean oil-modified urethane resin varnish having an oil length of 60%, an acid value of 5 and an OH value of 4.5 | 2,000 |

Mixture (2):

| | Parts |
|---|---|
| Acrylonitrile | 100 |
| Methyl methacrylate | 700 |
| 2-hydroxypropyl methacrylate | 60 |
| Styrene | 140 |
| Benzoyl peroxide | 10 |

In the same manner as described in (a) of Example 2, the above mixtures (1) and (2) were reacted to obtain a polymer dispersion (I) having a solids content of 49.5%.

(b) Synthesis of Dispersion (II)

Mixture (3):

| | Parts |
|---|---|
| Mineral spirits | 1,000 |
| 50% cotton seed oil-modified alkyd resin varnish same as that used in (a) of Example 1 | 2,000 |

Mixture (4):

| | Parts |
|---|---|
| Acrylonitrile | 100 |
| Methyl methacrylate | 700 |
| Reaction product between 2-hydroxypropyl methacrylate and toluene diisocyanate Ethyl methacrylate | 150 |
| Benzoyl peroxide | 10 |

In the same manner as described in (b) of Example 2, the mixtures (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. This polymer dispersion was coated on a substrate and heated at 100° C. for 30 minutes. As a result of the solvent extraction test made on the resulting film, it was found that the isocyanate group was highly cross-linked with the hydroxyl group in the resulting film. The resulting film was transparent and had an excellent gloss.

EXAMPLE 5

(a) Synthesis of Dispersion

A reaction vessel equipped with a stirrer, reflux cooler and a thermometer was charged with the following substances, and the reaction was carried out at 82° C. for about 2 hours under agitation:

| | Parts |
|---|---|
| Mineral spirits | 300 |
| 2-ethylhexyl acrylate | 45 |
| Butyl acrylate | 15 |
| Benzoyl peroxide | 0.6 |

Then, a mixture of the following ingredients was added dropwise to the reaction vessel over a period of 4 hours:

| | Parts |
|---|---|
| Acrylonitrile | 30 |
| Methyl methacrylate | 198 |
| Methacrylic acid | 12 |
| Benzoyl peroxide | 2.4 |

The reaction was carried out at 82 to 85° C. under agitation for about 14 hours to obtain a polymer dispersion (I) having a solids content of 49.5%.

(b) Synthesis of Dispersion (II)

A mixture of the following ingredients was reacted at 82° C. under agitation for about 2 hours.

| | Parts |
|---|---|
| Mineral spirits | 300 |
| 2-ethylhexyl acrylate | 45 |
| Butyl acrylate | 15 |
| Benzoyl peroxide | 0.6 |

Then, a mixture of the following ingredients was added to the above reaction mixture over a period of 4 hours:

| | Parts |
|---|---|
| Acrylonitrile | 30 |
| Methyl methacrylate | 174 |
| N-n-butoxymethyl acrylamide | 36 |
| Benzoyl peroxide | 2.4 |

The reaction was conducted at 82 to 85° C. under agitation for about 14 hours to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. This polymer dispersion was kept stable at room temperature for a period of three months. The thermosetting polymer dispersion was coated on a substrate and heated at 150° C. for 30 minutes. As a result of the solvent extraction test made on the thus formed film, it was found that in this film the carboxyl group of the polymer dispersion (I) was highly cross-linked with the butoxyacrylamide group of the polymer dispersion (II). The resulting film was transparent and had an excellent gloss.

EXAMPLE 6

(a) Synthesis of Dispersion (I)

Mixture (1):

| | Parts |
|---|---|
| Mineral spirits | 300 |
| Lauryl methacrylate | 45 |
| Butyl methacrylate | 15 |
| Benzoyl peroxide | 0.6 |

Mixture (2):

| | |
|---|---|
| Acrylonitrile | 30 |
| Methyl methacrylate | 192 |
| 2-hydroxyethyl methacrylate | 18 |
| Benzoyl peroxide | 2.4 |

The mixture (1) was reacted at 82° C. under agitation for 2 hours, and the mixture (2) was added dropwise to the above reaction mixture over a period of 4 hours. Then, the reaction was conducted at 82 to 85° C. under agitation for about 14 hours to obtain a polymer dispersion (I) having a solids content of 49.5%.

(b) Synthesis of Dispersion (II)

Mixture (3):

| | Parts |
|---|---|
| Mineral spirits | 300 |
| Lauryl methacrylate | 45 |
| Butyl methacrylate | 15 |
| Benzoyl peroxide | 0.6 |

Mixture (4):

| | |
|---|---|
| Acrylonitrile | 30 |
| Methyl methacrylate | 180 |
| Reaction product between 2-hydroxyethyl methacrylate and toluene diisocyanate | 30 |
| Benzoyl peroxide | 2.4 |

In the same manner as described in (a) above, the mixtures (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 2:1 to obtain a thermosetting polymer dispersion which was kept stable even after it had been allowed to stand at room temperature for 3 months. When this polymer dispersion was coated on a substrate and heated at 100° C. for 30 minutes, there was obtained a film which was transparent and had an excellent gloss. In the resulting film the isocyanate group was highly cross-linked with the hydroxyl group, and the film had a good solvent resistance.

EXAMPLE 7

(a) Synthesis of Disperson (I)

Mixture (1):

| | Parts |
|---|---|
| Mineral spirits | 1,000 |
| 50% coconut oil-modified alkyd resin medium oil varnish having an oil length of 55%, an acid value of 4 and an OH value of 5 | 1,000 |

Mixture (2):

| | |
|---|---|
| α-Methyl styrene | 100 |
| Methyl methacrylate | 600 |
| Acrylic acid | 100 |
| Styrene | 200 |
| Benzoyl peroxide | 10 |

In the same manner as described in Example 1, the mixture (1) was maintained at 85° C. and the mixture (2) was added to the above mixture over a period of 3 hours. The reaction was conducted at 85 to 90° C. for about 6 hours. Then, 10 parts of azobisisobutyronitrile was added to the reaction mixture and the reaction was further conducted for 4 hours to obtain a polymer dispersion (I) having a solids content of 49.8%.

(b) Synthesis of Dispersion (II)

Mixture (3):

| | Parts |
|---|---|
| Mineral spirits | 1,000 |
| 50% coconut oil-modified alkyd resin medium oil varnish same as that used in (a) above | 2,000 |

Mixture (4):

| | |
|---|---|
| Acrylonitrile | 100 |
| Methyl methacrylate | 600 |
| Glycidyl methacrylate | 150 |
| Styrene | 150 |
| Benzoyl peroxide | 10 |

In the same manner as described in (a) above, the mixtures (3) and (4) were reacted, and 10 parts of azobisisobutyronitrile was added to the reaction mixture and the reaction was further conducted at 85 to 90° C. for about 6 hours to obtain a polymer dispersion (II) having a solids content of 49.8%.

(c) Formation of Thermosetting Polymer Disperson and Formation of Film Therefrom The above polymer dispersions (I) and (II) were mixed together at a weight ratio of 1:2 to obtain a thermosetting polymer dispersion. When p-toluene-sulfonic acid was added as an acid catalyst to the above polymer dispersion and the dispersion was coated on a substrate and heataed at 140° C. for 30 minutes, there was obtaiened a transparent film having an excellent gloss. In the resulting film the carboxyl group was highly cross-linked with the epoxy group, and the resulting film had a good solvent resistance.

EXAMPLE 8

(a) Synthesis of Dispersion (I)

Mixture (1):

| | Parts |
|---|---|
| Mineral spirits | 1,000 |
| 50% soybean oil-modified epoxy resin varnish same as that used in Example 3 | 4,000 |

Mixture (2):

| | |
|---|---|
| Acrylonitrile | 100 |
| Methyl methacrylate | 600 |
| Maleic anhydride | 200 |
| Styrene | 100 |
| Benzoyl peroxide | 10 |

In the same manner as described above, the mixture (1) was maintained at 85° C. and the mixture (2) was added thereto over a period of 3 hours. The reaction was carried out under agitation at 85 to 90° C. for about 10 hours to obtain a polymer dispersion (I) having a solids content of 49.5%.

(b) Synthesis of Dispersion (II)

| Mixture (3): | Parts |
|---|---|
| Mineral spirits | 1,000 |
| 50% soybean oil-modified epoxy resin varnish same as that used in (a) above | 2,000 |
| Mixture (4): | |
| n-Butyl methacrylate | 100 |
| Methyl methacrylate | 600 |
| Allyl alcohol | 120 |
| Styrene | 180 |
| Benzoyl peroxide | 10 |

In the same manner as described in (a) above, the mixtures (3) and (4) were reacted to obtain a polymer dispersion (II) having a solids content of 49.5%.

(c) Formation of Thermosetting Polymer Disperson and Formation of Film Therefrom The above polymer dispersions (I) and (II) were mixed together at a weight ratio of 2:1 to obtain a thermosetting polymer dispersion. When this polymer dispersion was coated on a substrate and heated at 130° C. for 30 minutes, there was obtained a transparent film having an excellent gloss. In the resulting film, the acid anhydride group was highly cross-linked with the hydroxyl group and the film had a good solvent resistance.

EXAMPLE 9

(a) Synthesis of Dispersion (I)

| Mixture (1): | Parts |
|---|---|
| Mineral spirits | 1,000 |
| 50% coconut oil-modified alkyd resin medium oil varnish same as that used in Example 7 | 2,000 |
| Mixture (2): | |
| Vinyl toluene | 100 |
| Methyl methacrylate | 600 |
| Glycidyl methacrylate | 140 |
| Styrene | 160 |
| Benzoyl peroxide | 10 |

In the same manner as described in Example 1, the mixture (1) was maintained at 85° C. and the mixture (2) was added thereto over a period of 3 hours. The reaction was carried out under agitation at 85 to 90° C. for about 10 hours to obtain a polymer dispersion (I) having a solids content of 49.5%.

(b) Synthesis of Dispersion (II)

| Mixture (3): | Parts |
|---|---|
| Mineral spirits | 1,000 |
| 50% coconut oil-modified alkyd resin medium oil varnish same as that used in (a) above | 2,000 |
| Mixture (4): | |
| Acrylonitrile | 100 |
| Methyl methacrylate | 600 |
| t-Butylaminoethyl methacrylate | 200 |
| Styrene | 100 |
| Benzoyl peroxide | 10 |

In the same manner as described in (a) above, the mixture (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. When this polymer dispersion was coated on a substrate and heated at 100° C. for 30 minutes, there was obtained a transparent film having an excellent gloss. In the resulting film the epoxy group was highly cross-linked with the amino group, and the film had a good solvent resistance.

EXAMPLE 10

(a) Synthesis of Dispersion (I)

| Mixture (1): | Parts |
|---|---|
| Mineral spirits | 300 |
| Stearyl methacrylate | 30 |
| Di-tert-butyl peroxide | 0.3 |
| Mixture (2): | |
| α-Methyl styrene | 30 |
| Methyl methacrylate | 178 |
| Ethyl acrylate | 30 |
| 2-hydroxypropyl methacrylate | 32 |
| Di-tert-butyl peroxide | 2.7 |

The mixture (1) was reacted under agitation at 130° C. for 4 hours, and the mixture (2) was added to the resulting reaction mixture over a period of 4 hours. The reaction was carried out under agitation at 130 to 135° C. for about 14 hours to obtain a polymer dispersion (I) having a solids content of 49.5%.

(b) Synthesis of Dispersion (II)

| Mixture (3): | Parts |
|---|---|
| Mineral spirits | 300 |
| Stearyl methacrylate | 30 |
| Di-tert-butyl peroxide | 0.3 |
| Mixture (4): | |
| Acrylonitrile | 30 |
| Methyl methacrylate | 195 |
| n-Butyl acrylate | 30 |
| Reaction product between 2 - hydroxypropyl methacrylate and toluene diisocyanate | 15 |
| Di-tert-butyl peroxide | 2.7 |

In the same manner as described in (a) above, the mixtures (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:2 to obtain a thermosetting polymer dispersion. When this polymer dispersion was coated on a substrate and heated at 100° C. for 30 minutes, there was obtained a transparent film having an excellent gloss. In the resulting film the isocyanate group was highly cross-linked with the hydroxyl group, and the film had a good solvent resistance.

EXAMPLE 11

(a) Synthesis of Dispersion (I)

| Mixture (1): | Parts |
|---|---|
| Mineral spirits | 40 |
| Lauryl methacrylate | 60 |
| Benzoyl peroxide | 0.3 |
| Mixture (2): | |
| Mineral spirits | 260 |
| Vinyl toluene | 30 |
| Methyl methacrylate | 180 |
| Acrylic acid | 30 |
| Benzoyl peroxide | 2.7 |

The mixture (1) was reacted at 85° C. for 4 hours, and the mixture (2) was added thereto over a period of 4 hours. The reaction was conducted at 85 to 90° C. for about 14 hours to obtain a polymer dispersion (I) having a solids content of 49.5%.

(b) Synthesis of Dispersion (II)

| Mixture (3): | Parts |
|---|---|
| Mineral spirits | 40 |
| Stearyl methacrylate | 30 |
| Benzoyl peroxide | 0.3 |

| Mixture (4): | |
|---|---|
| Mineral spirits | 260 |
| Acrylonitrile | 30 |
| Methyl methacrylate | 165 |
| Ethyl acrylate | 30 |
| Glycidyl methacrylate | 45 |
| Benzoyl peroxide | 2.7 |

In the same manner as described in (a) above, the mixtures (3) and (4) were reacted to otbain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. When this dispersion was incorporated with p-toluene-sulfonic acid as an acid catalyst and it was coated on a substrate and heated at 140° C. for 30 minutes, there was obtained a transparent film having an excellent gloss. In the resulting film the carboxyl group was highly cross-linked with the epoxy group, and the film had a good solvent resistance.

EXAMPLE 12

(a) Synthesis of Dispersion (I)

| Mixture (1): | Parts |
|---|---|
| Mineral spirits | 60 |
| Stearyl methacrylate | 45 |
| Di-tert-butyl peroxide | 0.5 |

| Mixture (2): | |
|---|---|
| Mineral spirits | 240 |
| Styrene | 30 |
| Methyl methacrylate | 135 |
| Ethyl acrylate | 30 |
| Maleic anhydride | 60 |
| Benzoyl peroxide | 2.6 |

The mixture (1) was reacted under agitation at 130° C. for 4 hours, and then the reaction mixture was maintained at 85 to 90° C. The mixture (2) was added to the above reaction mixture over a period of 4 hours and the reaction was conducted under agitation for about 14 hours to obtain a polymer dispersion (I) having a solids content of 49.5%.

(b) Synthesis of Dispersion (II)

| Mixture (3): | Parts |
|---|---|
| Mineral spirits | 60 |
| Lauryl methacrylate | 45 |
| Di-tert-butyl peroxide | 0.5 |

| Mixture (4): | |
|---|---|
| Mineral spirits | 240 |
| Acrylonitrile | 30 |
| Methyl methacrylate | 159 |
| Ethyl acrylate | 30 |
| Allyl alcohol | 36 |
| Benzoyl peroxide | 2.6 |

In the same manner as described in (a) above, the mixtures (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. When this polymer dispersion was coated on a substrate and heated at 130° C. for 30 minutes, there was obtained a transparent film having an excellent gloss. In the resulting film the acid anhydride group was highly cross-linked with the hydroxyl group, and the film had a good solvent resistance.

EXAMPLE 13

(a) Synthesis of Dispersion (I)

| Mixture (1): | Parts |
|---|---|
| Mineral spirits | 60 |
| Stearyl methacrylate | 45 |
| Benzoyl peroxide | 0.5 |

| Mixture (2): | |
|---|---|
| Mineral spirits | 240 |
| Acrylonitrile | 30 |
| Methyl methacrylate | 153 |
| n-Butyl acrylate | 30 |
| Benzoyl peroxide | 2.6 |

The above mixtures (1) and (2) were reacted in the same manner as described in Example 11 to obtain a polymer dispersion (I) having a solids content of 49.5%.

(b) Synthesis of Dispersion (II)

| Mixture (3): | Parts |
|---|---|
| Mineral spirits | 60 |
| Stearyl methacrylate | 45 |
| Benzoyl peroxide | 0.5 |

| Mixture (4): | |
|---|---|
| Mineral spirits | 240 |
| Styrene | 30 |
| Methyl methacrylate | 135 |
| Ethyl acrylate | 30 |
| t-Butyl-aminoethyl methacrylate | 60 |
| Benzoyl peroxide | 2.6 |

In the same manner as described in (a) above, the above mixtures (3) and (4) were reacted to obtain a polymer dispersion (II) having a solids content of 49.5%.

(c) Formation of Thermosetting Polymer Dispersion and Formation of Film Therefrom The above polymer dispersions (I) and (II) were mixed together at a weight ratio of 1:1 to obtain a thermosetting polymer dispersion. When this polymer dispersion was coated on a substrate and heated at 100° C. for 30 minutes, there was obtained a transparent film having an excellent gloss. In the resulting film the epoxy group was highly cross-linked with the amino group, and the film had a good solvent resistance.

What is claimed is:

1. A thermosetting synthetic polymer dispersion comprising a mixture of
   (I) a synthetic polymer dispersion comprising particles of a copolymer formed from (A) a copolymerizable ethylenically unsaturated monomer and (B) a copolymerizable ethylenically unsaturated monomer having a chemically reactive cross-linking group and a protective layer formed around said copolymer particles, which is composed of a stabilizer (i) having a component compatible with said copolymer or beng chemically bonded thereto and (ii) being solvated in an organic liquid having no polarity or a low polarity, said copolymer particles being stably dispersed in the organic liquid by said protective layer and having an average particle size of 0.1 to 10$\mu$, and
   (II) a synthetic polymer dispersion comprising particles of a copolymer formed from (A) a copolymerizable ethylenically unsaturated monomer and (C) a copolymerizable ethylenically unsaturated monomer having a complementary, chemically reactive cross-linking group capable of reacting with the chemically reactive cross-linking group of the particles in dispersion (I) and a protective layer formed around said copolymer particles, which is composed of a stabilizer (i) having a component compatible with said copolymer or being chemically bonded thereto and (ii) being solvated in an organic liquid having no polarity or a low polarity, said copolymer particles being stably dispersed in the organic liquid by said protective layer and having an average particle size of 0.1 to 10$\mu$.

2. A thermosetting synthetic polymer dispersion set forth in claim 1 wherein the mixing weight ratio of the synthetic polymer dispersion (I) and the synthetic polymer disperision (II) based on the non-volatile components is within range of from 10/90 to 90/10.

3. A thermosetting synthetic polymer dispersion set forth in claim 1 wherein the weight ratio of the stabilizer solvated in the organic liquid and the copolymer in each of the synthetic polymer dispersions (I) and (II) is within a range of from 80/20 to 10/90.

4. A thermosetting synthetic polymer dispersion set forth in claim 1 wherein the stabilizer solvated in the organic liquid is a polymer of an $\alpha,\beta$-ethylentically unsaturated monomer and the weight ratio of the stabilizer and the copolymer in each of the synthetic polymer dispersions (I) and (II) is within a range of from 30/70 to 10/90.

5. A thermosetting synthetic polymer dispersion set forth in claim 1 wherein the stabilizer solvated in the organic liquid is selected from unsaturated fatty acid-containing oil-modified alkyd resins, unsaturated fatty acid-containing oil-modified epoxy resins and unsaturated fatty acid-containing oil-modified urethane resins, and the weight ratio of the stabilizer and the copolymer in each of the synthetic polymer dispersions (I) and (II) is within a range of from 80/20 to 20/80.

6. A thermosetting synthetic polymer dispersion set forth in claim 1 wherein the copolymerizable ethylenically unsaturated monomer (A) is a mixture consisting of methyl methacrylate and other ethylenically unsaturated monomer which does not contain a chemically reactive cross-linking group and a complementary chemically reactive cross-linking group.

7. A thermosetting synthetic polymer dispersion set forth in claim 1 wherein the copolymerizable ethylenically unsaturated monomer (A) is a mixture composed of acrylonitrile and other unsaturated monomers.

8. A process for the preparation of a thermosetting synthetic polymer dispersion having a chemically reactive cross-linking group or a complementary, chemically reactive cross-linking group in each of the synthetic polymer dispersed particles, which comprises mixing
   (I) a synthetic polymer dispersion obtained by copolymerizing (A) a vinyl monomer having a copolymerizable double bond in the molecule with (B) a vinyl monomer having in the molecule a copolymerizable double bond and a chemically reactive cross-linking group in an organic liquid having no polarity or a low polarity in the presence of a stabilizer solvated in said organic liquid, said stabilizer being at least one member selected from the group consisting of unsaturated fatty acid-containing oil-modified alkyd resins, unsaturated fatty acid-containing oil-modified epoxy resins and unsaturated fatty acid-containing oil-modified urethane resins, with
   (II) a synthetic polymer dispersion obtained by copolymerizing said vinyl monomer (A) with (C) a vinyl monomer having in the molecule a copolymerizable double bond and a complementary, chemically reactive cross-linking group capable of reacting with the chemically reactive cross-linking group of the particles in dispersion (I) in said organic liquid in the presence of said stabilizer.

9. A process for the preparation of a thermosetting synthetic polymer dispersion having a chemically reactive cross-linking group or a complementary, chemically reactive cross-linking group in each of the synthetic polymer dispersed particles, which comprises mixing
   (I) a synthetic polymer dispersion obtained by copolymerizing (A) a vinyl monomer having a copolymerizable double bond in the molecule with (B) a vinyl monomer having in the molecule a copolymerizable double bond and a chemically reactive cross-linking group in an organic liquid having no polarity or a low polarity in the presence of a stabilizer solvated in said organic liquid, said stabilizer being composed of a polymer of (D) and $\alpha,\beta$-ethylenically unsaturated monomer, with
   (II) a synthetic polymer dispersion obtained by copolymerizing said vinyl monomer (A) with (C) a vinyl monomer having in the molecule a copolymerizable double bond and a complementary, chemically reactive cross-linking group in said organic liquid in the presence of said stabilzer.

10. A process for the preparaton of a thermosetting synthetic polymer dispersion having a chemically reactive cross-linking group or a complementary, chemically reactive cross-linking group in each of the synthetic polymer dispersed particles, which comprises polymerizing (D) an $\alpha,\beta$-ethylenically unsaturated monomer in an organic liquid having no polarity or a low polarity to obtain a stabilizer solvated in said organic liquid, and mixing
   (I) a synthetic polymer dispersion obtained by copolymerizing (A) a vinyl monomer having a copolymerizable double bond in the molecule with (B) a vinyl monomer having in the molecule a copolymerizable double bond and a chemically reactive cross-linking group in the presence of said stabilizer, with
   (II) a synthetic polymer dispersion obtained by copolymerizing said vinyl monomer (A) with (C) a vinyl monomer having in the molecule a copolymerizable double bond and a complementary, chemically reactive cross-linking group capable of reacting with the chemically reactive cross-linking group of the particles in dispersion (I), in said stabilizer.

References Cited

UNITED STATES PATENTS

| | | | |
|---|---|---|---|
| 3,382,297 | 5/1968 | Thompson | 260—875 |
| 2,964,417 | 12/1960 | Ward | 260—34.2 |
| 2,591,904 | 4/1952 | Zola | 106—170 |
| 2,918,445 | 12/1959 | Tarwid | 260—32.8 |
| 3,390,206 | 6/1968 | Thompson et al. | 260—875 |
| 3,676,526 | 7/1972 | Sommerfeld | 260—876 R |
| 3,686,111 | 8/1972 | Makhlouf et al. | 260—31.2 |
| 3,691,123 | 9/1972 | Clarke et al. | 260—33.6 UA |
| 3,736,279 | 5/1973 | Camelon et al. | 260—21 |

RONALD W. GRIFFIN, Primary Examiner

U.S. Cl. X.R.

117—161 K, 161 KP, 161 UZ; 260—23 R, 23 AR, 23 P, 23 EP, 23 TN, 33.6 UA, 33.6 R